US008649985B2

(12) United States Patent
Dong et al.

(10) Patent No.: US 8,649,985 B2
(45) Date of Patent: Feb. 11, 2014

(54) PATH-DEPENDENT CYCLE COUNTING AND MULTI-AXIAL FATIGUE EVALUATION OF ENGINEERING STRUCTURES

(75) Inventors: Pingsha Dong, Columbus, OH (US); Zhigang Wei, Ann Arbor, MI (US); Jeong K. Hong, Dublin, OH (US)

(73) Assignee: Battelle Memorial Institute, Columbus, OH (US)

( * ) Notice: Subject to any disclaimer, the term of this patent is extended or adjusted under 35 U.S.C. 154(b) by 369 days.

(21) Appl. No.: 13/143,630

(22) PCT Filed: Oct. 30, 2009

(86) PCT No.: PCT/US2009/062780
§ 371 (c)(1),
(2), (4) Date: Aug. 4, 2011

(87) PCT Pub. No.: WO2010/080196
PCT Pub. Date: Jul. 15, 2010

(65) Prior Publication Data
US 2011/0288790 A1    Nov. 24, 2011
US 2012/0130650 A9    May 24, 2012

Related U.S. Application Data

(60) Provisional application No. 61/143,231, filed on Jan. 8, 2009.

(51) Int. Cl.
*G01B 3/44*    (2006.01)
(52) U.S. Cl.
USPC .......................................................... 702/34
(58) Field of Classification Search
USPC .......................................................... 702/34
See application file for complete search history.

(56) References Cited

U.S. PATENT DOCUMENTS 3,660,788 A    5/1972    Alsberg
4,463,329 A    7/1984    Suzuki
(Continued)

OTHER PUBLICATIONS

ASTM International, "Standard Practice for Statistical Analysis of Linear or Linearized Stress-Life (S-N) and Strain-Life (e-N) Fatigue Data", Designation: E739-91, 2004.

(Continued)

*Primary Examiner* — Stephen Cherry
(74) *Attorney, Agent, or Firm* — Dinsmore & Shohl LLP

(57) ABSTRACT

A method is provided for performing fatigue evaluation of a fatigue prone location of a tangible structure by converting multi-axial loading data of the fatigue prone location of the tangible structure to a set of equivalent constant amplitude loading data for the tangible structure. According to the method, a multi-axial load locus representing the tangible structure is generated. Time-dependent interior turning points R and any corresponding projected turning point R* art identified along the loading path from the point of origin P to the point of termination Q. Half cycles in the loading path are counted by referring to the interior and projected turning points R, R* along the loading path and to the point of origin P and the point of termination Q on the load locus. A stress range $\Delta\sigma_e$, loading path length L, and virtual path length for each of the counted half cycles are determined. Additional stress ranges $\Delta\sigma_e$, loading path lengths L, and virtual path lengths are determined recursively for half cycles counted in additional loading paths on the load locus. A system is also provided for performing fatigue evaluation. Methods are also provided for counting and displaying the number of load cycles represented in multi-axial loading data of a fatigue prone location of the tangible structure. Additional embodiments are disclosed and claimed.

24 Claims, 5 Drawing Sheets

(56) References Cited

U.S. PATENT DOCUMENTS

| | | | |
|---|---|---|---|
| 4,517,536 | A | 5/1985 | Stern et al. |
| 4,603,942 | A | 8/1986 | Chang et al. |
| 4,800,350 | A | 1/1989 | Bridges et al. |
| 6,469,599 | B1 | 10/2002 | Otto et al. |
| 6,580,343 | B2 | 6/2003 | Saitoh et al. |
| 6,901,809 | B2 | 6/2005 | Dong et al. |
| 7,084,716 | B2 | 8/2006 | Agoston et al. |
| 7,089,124 | B2 | 8/2006 | Dong et al. |
| 7,516,673 | B2 | 4/2009 | Dong et al. |
| 2008/0036558 | A1 | 2/2008 | Suarez-Gartner et al. |
| 2008/0258848 | A1 | 10/2008 | Quan et al. |

OTHER PUBLICATIONS

Dong et al., "A Robust Structural Stress Parameter for Evaluation of Multiaxial Fatigue of Weldments", Journal of ASTM International, vol. 3, No. 7, Paper ID JAI100348, 2006.

Feng et al., "A study of loading path influence on fatigue crack growth under combined loading", International Journal of Fatigue 28, pp. 19-27, 2006.

Jabbado et al., "A high-cycle fatigue life model for variable amplitude multiaxial loading", The Authors, Journal compilation, Fatigue Fract Enging Matter Struct 31, pp. 67-75, 2008.

Wei et al., "The Equivalency-Based Statistical Analysis of Linear or Linearized Stress-Life (S-N) and Strain-Life (e-N) Fatigue data", Battelle Memorial Institute, Dec. 2009.

Eric W. Weisstein, "Least Squares Fitting—Perpendicular Offsets", Math World—A Wolfram web Resource, http://mathworld.wolfram.com/LeastSquaresFittingPerpendicularOffsets.html.

Gwenaelle Genet, "A statistical approach to multi-input equivalent fatigue loades for durability of automotive structures", Thesis for the Degree of Doctor of Philosphy, www_math_chalmers_se_Doctoral pp. 1-12, 2006.

"Conclusion—12.1 Models of Life prediction and equivalence of damage", www_math_chalmers_se_Doctoral, pp. 185-190, 2006.

International Search Report and Written Opinion for PCT/US2009/062780 mailed Mar. 15, 2010.

PATH-DEPENDENT CYCLE COUNTING AND MULTI-AXIAL FATIGUE EVALUATION OF ENGINEERING STRUCTURES

CROSS-REFERENCE TO RELATED APPLICATIONS

This application is a U.S. national phase entry of International Application No. PCT/US2009/062780, filed Oct. 30, 2009, which claims the benefit of U.S. Provisional Application Ser. No. 61/143,231, filed Jan. 8, 2009.

The present disclosure relates generally to fatigue life prediction in a variety of structures. More particularly, the present invention relates to fatigue life prediction in structures that comprise fatigue prone locations like welded or non-welded components, laminated regions, weight bearing regions, extensions, flexures, buttresses, etc. Fatigue damage in these types of fatigue prone locations can be caused by more than one stress or strain component under either proportional or non-proportional variable amplitude loading conditions. For the purposes of defining and describing embodiments of the present disclosure, it is noted that the stress or strain components of particular loading conditions are referred to herein as being proportional, i.e., in-phase with each other, or non-proportional, i.e., out-of-phase with each other, and that "multi-axial fatigue" represents fatigue damage that is caused by more than one stress or strain component. Many of the procedures described herein yield cycle counting results that match those of conventional rainflow counting methods, which are not capable of dealing with multiaxial loading, but do so with a significantly simplified procedure. Without limitation, and by way of illustration only, the concepts of the present disclosure can be applied to components and systems in the automotive, aerospace, offshore/marine, mining and earth moving equipment, civil, power generation and petrochemical industries.

As part of the engineering design component of typical manufacturing processes, engineers are often required to assess how well a particular product design will satisfy static performance requirements, e.g., under specific one time loading events, and how durable the product will be over its life cycle, e.g., under repeated loading events or cyclic loading. In many instances, the product to be designed will be subject to multi-axial variable amplitude loading conditions and it is particularly challenging to predict fatigue life under these conditions. Accordingly, the present inventors have recognized the need for cycle counting methods capable of converting multiaxial variable amplitude stress or strain histories to a specified number of equivalent stress or strain ranges with corresponding cycle counts. This type of conversion can be conveniently represented as a stress or strain histogram.

The present disclosure introduces a methodology for converting multi-axial, variable amplitude, loading data to a set of equivalent stress, strain or load ranges, and corresponding cycle counts, to predict fatigue life, regardless of whether the loading is in-phase or out-of-phase. Although the present disclosure is directed primarily at providing a comprehensive methodology for treating arbitrary, multi-axial, variable amplitude loading data for fatigue design and life prediction, the methodology disclosed herein incorporates a number of components of independent novelty such as, for example, procedures that utilize loading paths of a load locus to count cycles, procedures for defining stress ranges or amplitudes, procedures for identifying path-dependent effective stress ranges or amplitudes for fatigue prone locations in structures that are subject to multi-axial variable amplitude loading conditions, etc.

In accordance with one embodiment disclosed herein, a method is provided for performing fatigue evaluation of a fatigue prone location of a tangible structure by converting multi-axial loading data of the fatigue prone location of the tangible structure to a set of equivalent constant amplitude loading data for the tangible structure. According to the method, a multi-axial load locus representing the tangible structure is generated. A maximum range between two points on the load locus is identified to define a loading path along at least a portion of the load locus. The loading path extends from a point of origin P to a point of termination Q. Time-dependent interior turning points R and any corresponding projected turning points R* are identified along the loading path from the point of origin P to the point of termination Q. Half cycles in the loading path are counted by referring to the interior and projected turning points R, R* along the loading path and to the point of origin P and the point of termination Q on the load locus. A stress range $\Delta\sigma_e$, loading path length L, and virtual path length for each of the counted half cycles are determined. Additional stress ranges $\Delta\sigma_e$, loading path lengths L, and virtual path lengths are determined recursively for half cycles counted in additional loading paths on the load locus. Data representing the counted half cycles, the stress ranges $\Delta\sigma_e$, the loading path lengths L, the virtual path lengths or combinations thereof, are converted to a tangible set of equivalent constant amplitude loading data representing the tangible structure and the tangible set of equivalent constant amplitude loading data is displated as a representation of the tangible structure. A system is also provided for performing fatigue evaluation.

In accordance with another embodiment, a method is provided for counting and displaying the number of load cycles represented in multi-axial loading data of a fatigue prone location of the tangible structure. Additional embodiments are disclosed and claimed.

The following detailed description of specific embodiments of the present invention can be best understood when read in conjunction with the following drawings, where like structure is indicated with like reference numerals and in which.

Figure 8:
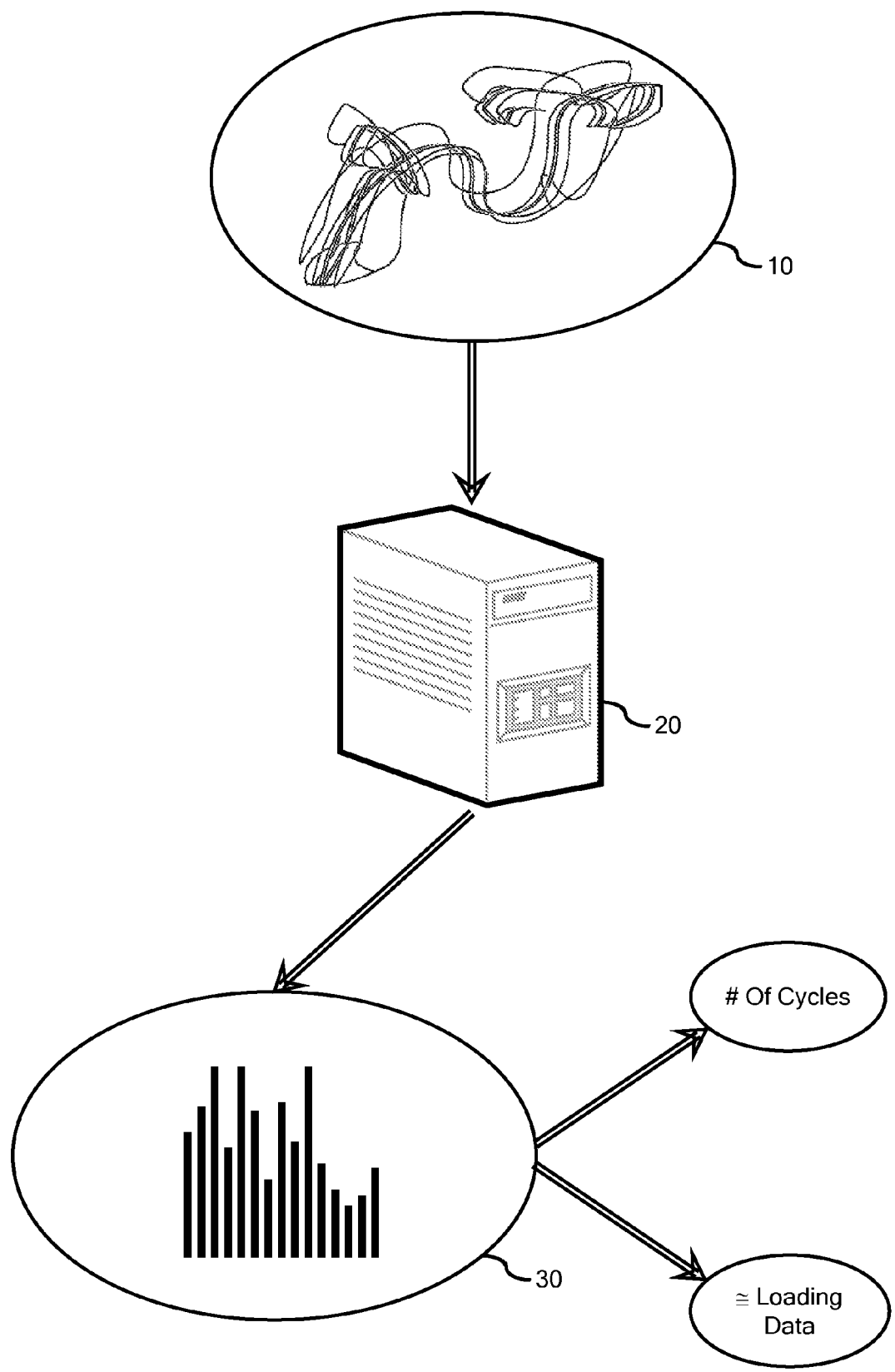
Figure 9:
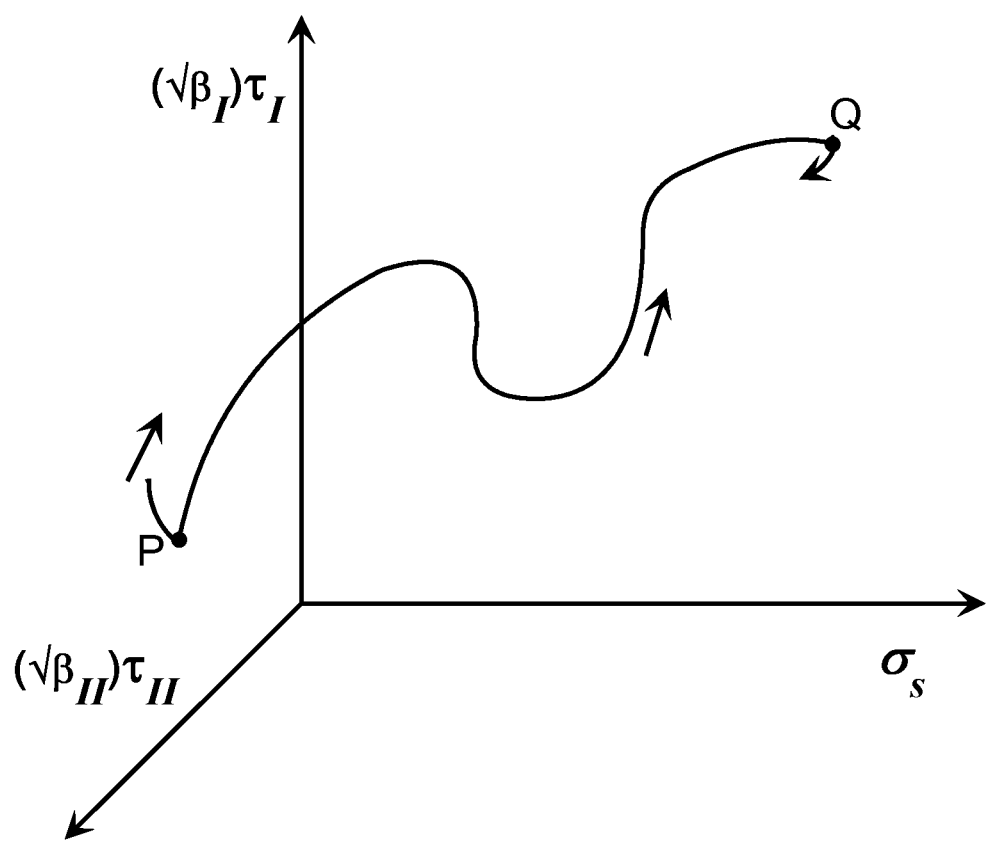

FIG. 8 is an illustration of a system for converting variable amplitude, multi-axial stress or strain data into a set of equivalent constant amplitude data; and FIG. 9 is an illustration of a simplified multi-axial load locus with three independent components where normal stress $\sigma_s$ and shear stresses $\tau_I$ and $\tau_{II}$ time histories acting on a critical plane are mapped over time in a $\sigma_s \leftrightarrow \sqrt{\beta_I}\tau_I \leftrightarrow \sqrt{\beta_{II}}\tau_{II}$ plane.

The systems and methodology disclosed herein, where fatigue design and life prediction of a fatigue prone location of a tangible structure is performed by converting multi-axial loading data of the fatigue prone location of the tangible structure to a set of equivalent constant amplitude loading data for the tangible structure, relies upon the mapping of the stress or strain history of the fatigue prone location under a one-time or repeated loading event. This mapping represents the tangible structure and can be manifested in a space of dimension n, where n represents the number of independent stress or strain components used in the mapping. Useful conversion can be achieved using as few as one stress or strain component, such as, normal stress $\sigma_s$ or shear stress $\tau_s$, or as many as six independent stress or strain components in the fatigue prone location.

Figure 1:
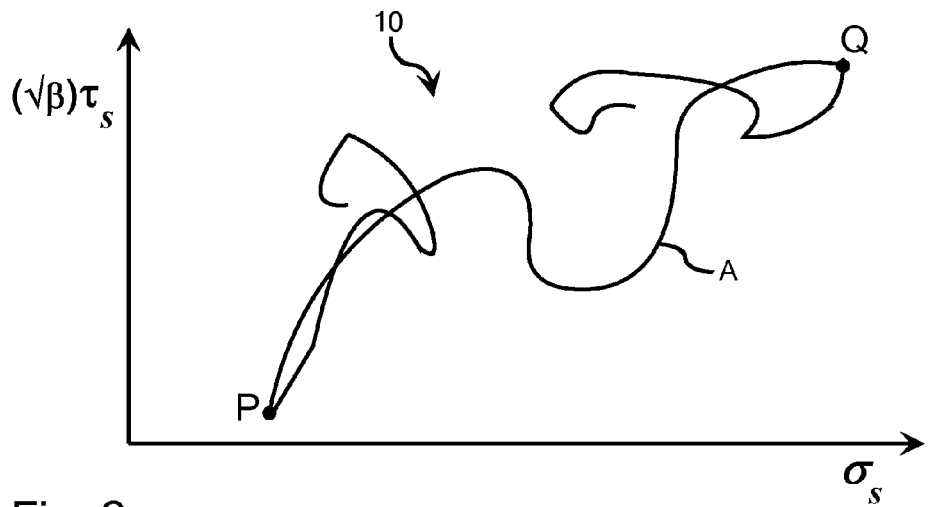
FIG. 1 is an illustration of a simplified multi-axial load locus where normal stress $\sigma_s$ and shear stress $\tau_s$ time histories acting on a critical plane are mapped over time in a $\sigma_s \leftrightarrow \sqrt{\beta}\tau_s$ plane.

FIG. 1 is an illustration of a simplified bi-axial load locus where n=2 and the independent components comprise normal stress $\sigma_s$ and shear stress $\tau_s$ acting on a critical plane and are mapped over time. A more complex, although still somewhat simplified load locus 10 is illustrated in FIG. 8. The parameter β a material constant relating fatigue damage between tension, or bending, and torsion loading modes. In this embodiment, the shear axis amplitude (i.e., vertical axis in FIG. 1) is represented by $\sqrt{\beta}\tau_s$. The parameter β is defined as an equivalency ratio of the fatigue strengths between the normal stress based fatigue tests and shear stress based tests in terms of their corresponding structural stress ranges at a life range of interest since the ratio between these two sets of data may not be constant over a wide range of fatigue cycle N. β=3 has been established from available experimental data to be applicable for most steel structures.

In an alternative embodiment, the shear stress amplitude may be represented by $$\sqrt{\beta}\frac{\tau_s}{|\tau_s|}|\tau_s|^\gamma,$$

where the parameter β is defined as before, and the parameter γ, which may be a constant based on the type of material used. Using both β and γ to determine the amplitude of the shear stress may be referred to as the beta-gamma method. When using the beta-gamma method, the shear amplitude axis may use the above equation (instead of $\sqrt{\beta}\tau_s$ as depicted in FIGS. 1-7. The equivalent shear stress of the beta-gamma method may be $$\Delta\tau^* = \sqrt{\beta}(\tau_{max}^\gamma - \tau_{min}^\gamma)$$

for loading with positive stress only, and the equivalent shear stress of the beta-gamma method may be $$\Delta\tau^* = \sqrt{\beta}\left(\frac{\tau_{max}}{|\tau_{max}|}|\tau_{max}|^\gamma - \frac{\tau_{min}}{|\tau_{min}|}|\tau_{min}|^\gamma\right)$$

for any kind of loading, positive or negative.

The values of β and γ may be obtained by a least square curve fitting method and may be considered universal values for multi-axial fatigue life assessment. For example, one set of values that may work well for some materials may be β=2.2129 and γ=0.9558. After obtaining these parameters, the multi-axial fatigue life may be assessed under in-phase, out-of-phase, or any type of variable amplitudes in a unified framework within the context of a conventional S-N curve. The multi-axial S-N curve may be useful because the slopes of a conventional S-N curve and a shear S-N curve are often very different (e.g., 3 versus 8), and there may be no way to combine them together and treat the multi-axial life assessment consistently. As a result, the multi-axial S-N curve may be considered a compromise. The beta-gamma method may resolve this problem and render the multi-axial S-N curve unnecessary. Furthermore, the beta-gamma method may provide better data correlation than by simply using β and may be applied to the path-dependent cycle counting techniques described herein.

In yet another embodiment, the shear stress amplitude may be represented in any other kind of equivalent form $\tau^*$ with respect to the reference stress $\sigma_s$; and the normal stress amplitude may be represented in any other kind of equivalent form $\sigma^*$ if $\tau_s$ is treated as the reference stress.

FIG. 9 illustrates an example of multi-axial load locus with three stress components: normal stress $\sigma_s$ and shear stresses $\tau_I$, and $\tau_{II}$, which respectively represent three mutually perpendicular stress components, while constants $\beta_I$ and $\beta_{II}$ are material-related parameters relating fatigue damage between the normal stress $\sigma_s$ and the two shear stress components. In any case, it is contemplated that the dimension n may represent a variety of conditions including, but not limited to, uniaxial loading where n=1, bi-axial loading where n=2, three structural stress components where n=3, as would be the case in traction and fracture mechanics, or complete stress or strain tensors with six independent components in general three-dimensional continuum structures, where n=6.

Figure 2:
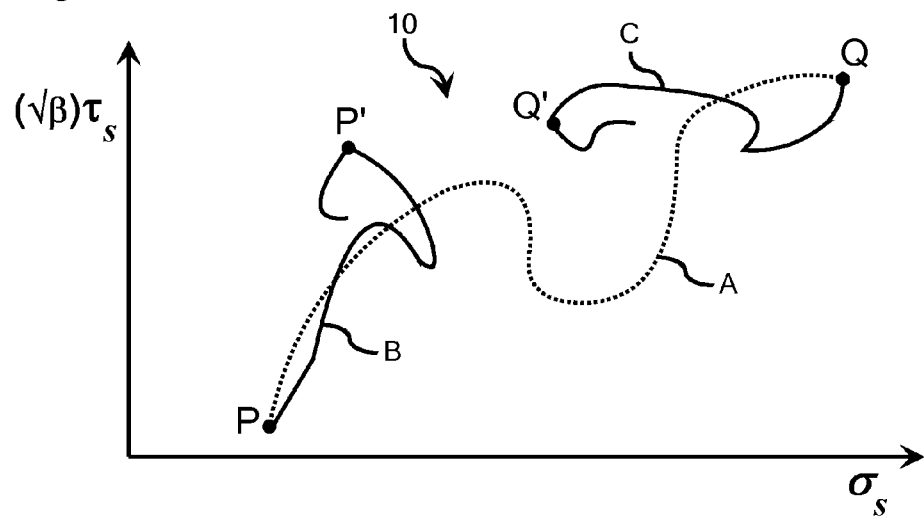
FIG. 2 is an illustration of the simplified multi-axial load locus of FIG. 1 in a $\sigma_s \leftrightarrow \sqrt{\beta}\tau_s$ plane, with a loading path of the locus illustrated in phantom.
Figure 3:
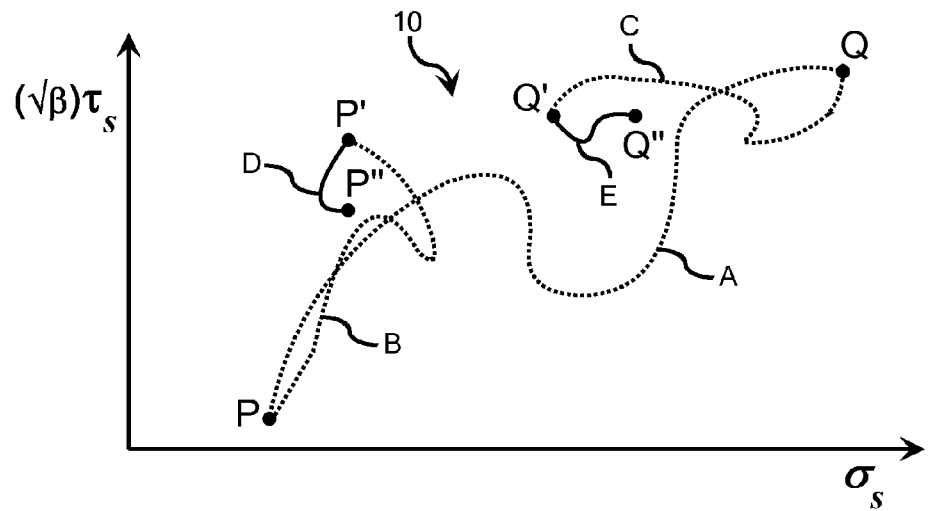
FIG. 3 is an illustration of the simplified multi-axial load locus of FIG. 1 in a $\sigma_s \leftrightarrow \sqrt{\beta}\tau_s$ plane, with loading paths of the locus illustrated in phantom.

Referring to the simplified load locus 10 of FIG. 1, to initiate conversion of the multi-axial, variable amplitude loading data at a fatigue prone location of the given structure to a set of equivalent constant amplitude loading data for the structure, the maximum range defined by the load locus 10 is identified by referring to the two furthest displaced points on the load locus 10. In the case of the load locus 10 illustrated in FIG. 1, the maximum range is clearly identified as the distance between points P and Q on the load locus 10. These points, which are referred to herein as the point of origin P and the point of termination Q, define a loading path A extending along the load locus 10 between P and Q. FIGS. 2 and 3 illustrate additional loading paths B, C, D, and E, which will be discussed in further detail below.

Figure 4:
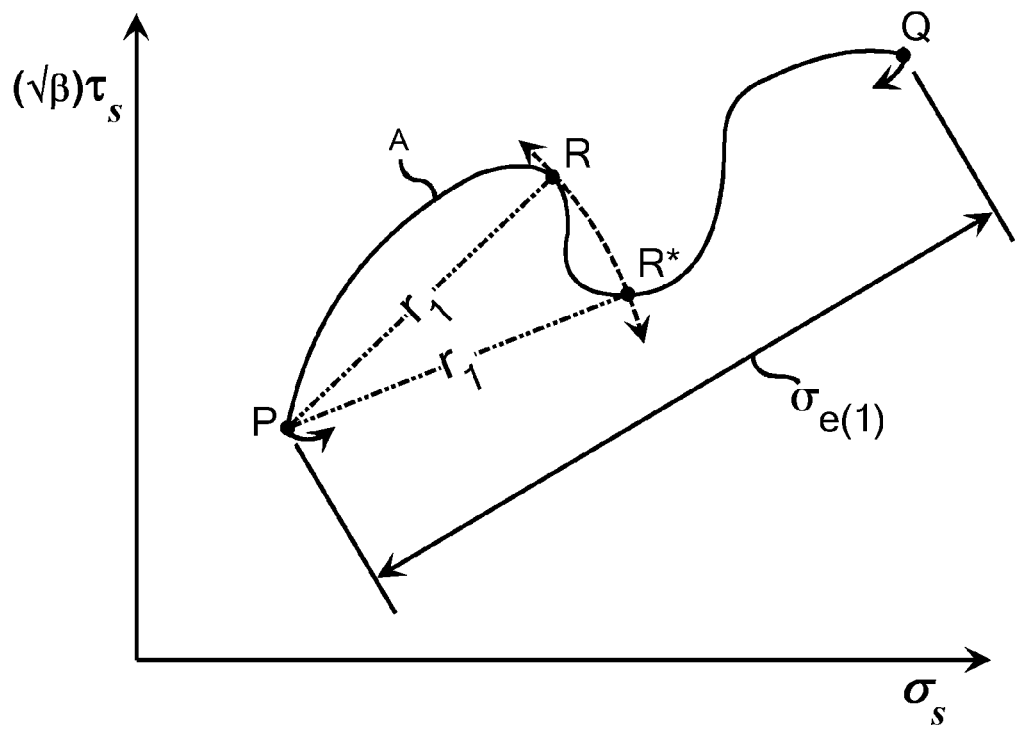
FIGS. 4 and 5 are illustrations of the components of the primary loading path of FIG. 1 in a $\sigma_s \leftrightarrow \sqrt{\beta}\tau_s$ plane.

FIG. 4, which is an isolated illustration of the loading path A, illustrates the manner in which time-dependent interior turning points R and the corresponding projected turning points R* can be identified along a loading path A. Specifically, referring to the point of origin P of the loading path A, the time-dependent interior turning point R and the projected turning point R* can be identified by referring to the net travel distance along the loading path A from the point P. For example, at point R, the net travel distance from point P is $r_1$. Also at point R, the net travel distance stops increasing and begins to fall below $r_1$, as is illustrated by the circumferential projection of $r_1$. Point R is identified as a time-dependent interior turning point because it marks the general area in which the net travel distance from the point of origin P stops increasing. The corresponding projected turning point R* can be identified by identifying the point at which the net travel distance recovers from the previous reduction. The projected turning point R* is illustrated in FIG. 4 as the point at which the net travel distance from point P returns to $r_1$.

Figure 5:
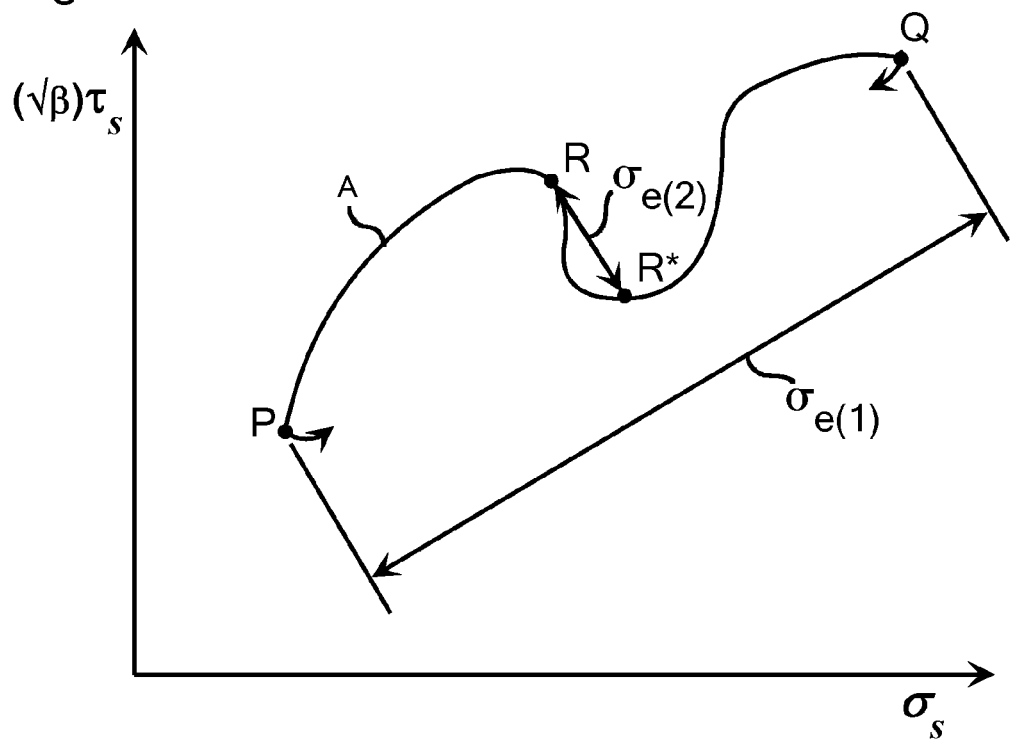
Figure 6:
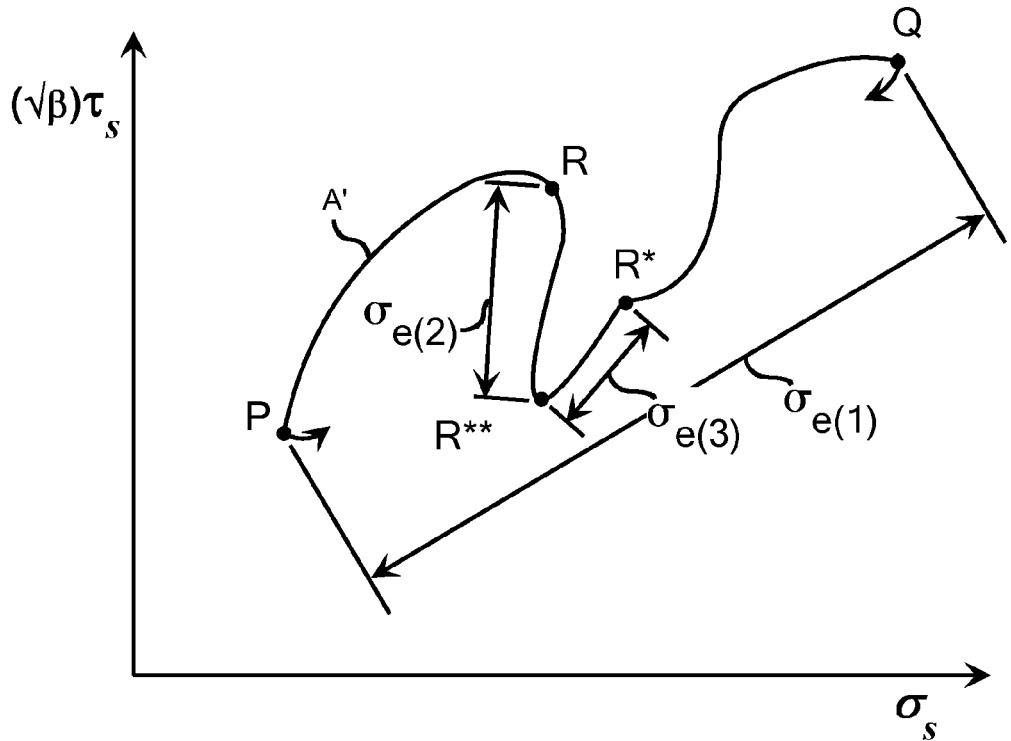
FIG. 6 is an illustration of a first variation of the primary loading path of FIG. 1 in a $\sigma_s \leftrightarrow \sqrt{\beta}\tau_s$ plane.

FIG. 6 presents a first variation A' of the loading path A illustrated in FIGS. 4 and 5. As was the case in FIG. 4, R and R* are defined as the interior and projected turning points. However, in FIG. 6, a second maximum range identification is performed on the loading path between the turning points R and R*. The points R and R** are identified as the new point of origin and the new point of termination, respectively, for the new maximum range between the turning points R and R*. There is no interior turning point available between R and R because the net distance continuously increases along this path. A third maximum range identification is performed on the rest of the loading path from R to R* and R** and R* are identified as the new point of origin and the new point of termination, respectively, for the third maximum range. As was the case for the second maximum range between R and R, there is no interior turning point available between R and R* because the net distance continuously increases along this path.

Figure 7:
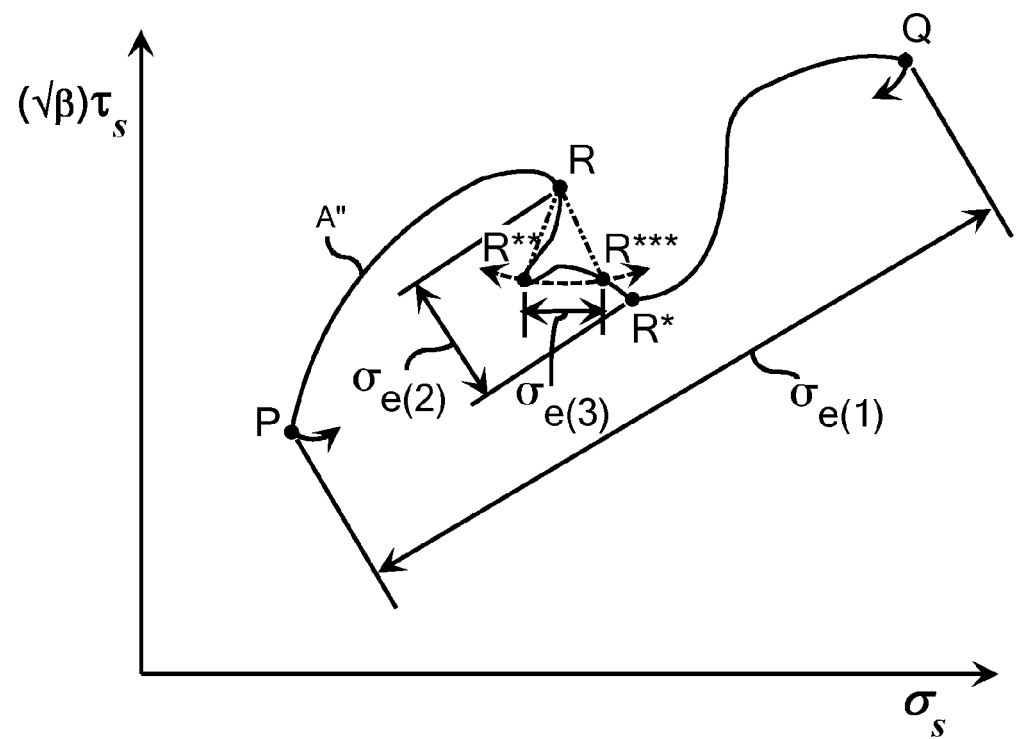
FIG. 7 is an illustration of a second variation of the primary loading path of FIG. 1 in a $\sigma_s \leftrightarrow \sqrt{\beta}\tau_s$ plane.

FIG. 7 presents a further variation A" of the loading path A illustrated in FIG. 4. The interior and projected turning points R and R* of the modified loading path A" are identified in the manner illustrated in FIG. 4. Subsequently, R and R* are identified as the new point of origin and the new point of termination and a second maximum range identification is performed on the path between the turning points R and R* to identify R and R* as the new interior and projected turning points because the net travel distance from the new point of origin R stops increasing at the point R and recovers at R*. The new points of origin and termination R and R*, and the loading path defined there between, are analogous to that which is defined between points P and Q in FIG. 4 so the analysis of the loading path between R and R* continues in the manner set forth in FIG. 4 for the loading path between the point of origin P and the point of termination Q.

Collectively, FIGS. 4, 6 and 7 illustrate the basis upon which interior turning points and the corresponding projected turning points may be identified in a variety of loading paths of varying shape and complexity. Once the interior turning points and corresponding projected turning points of a given loading path have been identified, half cycles in the loading path can be counted by referring to the various points of origin and termination identified along the loading path. For example, in FIG. 4, half cycles are counted in the loading path A by assigning one half cycle to the loading path A as a whole, as defined by the two points P, Q on the load locus. Additional half cycles are assigned to any additional points of origin and termination along the loading path A, which, in FIG. 4, would be the interior turning point R and the corresponding projected turning point R*. Accordingly, for the loading path A illustrated in FIG. 4, we have two 0.5 loading cycles, one corresponding to the range from the point of origin P to the point of termination Q and one corresponding to the range between points R and R*, as summarized in Table 1, where the stress ranges $\Delta\sigma_e$ is the distance between two points in the $\sigma_s \leftrightarrow \sqrt{\beta}\tau_s$ plane of the load locus:

TABLE 1

Cycle Count for Load Path A (FIG. 4):

| Number of Cycles | Stress Range ($\sigma_e$) |
|---|---|
| 0.5 | P-Q |
| 0.5 | R-R* |

In FIG. 6, the modified loading path A' is broken-up by three turning points R, R*, and R**. R is the point of origin for the second half-cycle and R* is the point of termination for the third half-cycle. R is the point of termination for the second half-cycle and the point of origin for the third half-cycle. Accordingly, for the modified loading path A' of FIG. 6, we have three 0.5 loading cycles, one corresponding to the range from the point of origin P to the point of termination Q, one corresponding to the range between points R and R, and one corresponding to the range between points R** and R*, as summarized in Table 2.

TABLE 2

Cycle Count for Load Path A' (FIG. 6):

| Number of Cycles | Stress Range ($\sigma_e$) |
|---|---|
| 0.5 | P-Q |
| 0.5 | R-R** |
| 0.5 | R**-R* |

In FIG. 7, the modified loading path A" comprises two independent turning point pairs: R-R* and R-R*. R and R* are the point of origin and the point of termination for the second half-cycle, respectively. R and R* are the point of origin and the point of termination for the third half-cycle, respectively. Accordingly, for the modified loading path A" of FIG. 7, we have three 0.5 loading cycles, one corresponding to the range from the point of origin P to the point of termination Q, one corresponding to the range between the first pair of turning points R-R*, and one corresponding to the range between the second pair of turning points R-R*, as summarized in Table 3:

TABLE 3

Cycle Count for Load Path A" (FIG. 7):

| Number of Cycles | Stress Range ($\sigma_e$) |
|---|---|
| 0.5 | P-Q |
| 0.5 | R-R* |
| 0.5 | R**-R*** |

The stress range $\Delta\sigma_e$ for each half cycle can be determined by referring to the shortest-distance measurement between the points at which the half cycle originates and terminates, e.g., either between points P and Q or between the turning point pairs of the selected half cycle. For example, referring to the primary loading path A of FIGS. 4 and 5, $\sigma_{e(1)}$ represents the stress range of the first half cycle because it marks the shortest-distance measurement between points P and Q. The range $\sigma_{e(2)}$ represents the stress range of the second half cycle because it marks the shortest-distance measurement between points R and R*.

For the modified loading path A' of FIG. 6, $\sigma_{e(1)}$ represents the stress range of the first half cycle because it marks the shortest-distance measurement between points P and Q. The range $\Delta\sigma_{e(2)}$ represents the stress range of the second half cycle because it marks the shortest-distance measurement between points R and R. The range $\Delta\sigma_{e(3)}$ represents the stress range of the final half cycle because it marks the shortest-distance measurement between points R and R*.

For the modified loading path A" of FIG. 7, $\sigma_{e(1)}$ represents the stress range of the first half cycle because it marks the shortest-distance measurement between points P and Q. The range $\sigma_{e(2)}$ represents the stress range of the second half cycle because it marks the shortest-distance measurement between turning points R and R*. The range $\sigma_{e(3)}$ represents the stress range of the final half cycle because it marks the shortest-distance measurement between turning points R and R*.

The loading path length L is, in addition to stress range, an important parameter for measuring out-of-phase or non-proportional loading fatigue damage and can be determined for each half cycle by summing real and virtual path lengths along the loading path. More specifically, the loading path length of a given half cycle can be determined by summing (i) real path length values for those portions of the loading path that are outside of the turning and projected turning point pairs along the loading path in the selected half cycle and (ii)

virtual path length values between the outermost interior turning points and the corresponding projected turning points of the selected half cycle if the selected cycle includes interior turning points and the corresponding projected turning points. For example, referring to the half cycles of the loading path A of FIG. 4, where the number of cycles and corresponding stress ranges are summarized in Table 1, the corresponding loading path length L for the P-Q half cycle is as follows:

$$\overset{\frown}{PQ} = \overset{\frown}{PR} + \overset{\cup}{RR^*} + \overset{\frown}{R^*Q}$$

where $\overset{\frown}{PR}$ represents the real path length along the loading path A between points P and R, $\overset{\cup}{RR^*}$ represents the circular arced "virtual path length" connecting R and R*, which can be approximated by the length of straight line connecting R and R*, and $\overset{\frown}{R^*Q}$ represents the real path length along the loading path A between points R* and Q.

Referring to the R-R* half cycle of FIG. 4, where the half cycle does not include interior turning points, the loading path length L for the R-R* half cycle is merely determined by referring only to the real path length along the loading path A between points R and R*: $\overset{\frown}{RR^*}$.

Referring to the half cycles of the modified loading path A' of FIG. 6, where the number of cycles and corresponding stress ranges are summarized in Table 2, the loading path length L for the P-Q half cycle is as follows:

$$\overset{\frown}{PQ} = \overset{\frown}{PR} + \overset{\cup}{RR^*} + \overset{\frown}{R^*Q}$$

The loading path length L for the R-R half cycle is merely determined by referring only to the real path length along the loading path A' between points R and R: $\overset{\frown}{RR^{}}$. The loading path length L for the R-R* half cycle is also merely determined by referring only to the real path length along the loading path A' between points R** and R*: $\overset{\frown}{R^{**}R^*}$.

Referring to the half cycles of the modified loading path A" of FIG. 7, where the number of cycles and corresponding stress ranges are summarized in Table 3, the loading path length L for the P-Q half cycle is as follows:

$$\overset{\frown}{PQ} = \overset{\frown}{PR} + \overset{\cup}{RR^*} + \overset{\frown}{R^*Q}$$

The loading path length L for the R-R* half cycle is as follows:

$$\overset{\frown}{RR^*} = \overset{\frown}{RR^{*}} + \overset{\cup}{R^{}R^{*}} + \overset{\frown}{R^{*}R^*}$$

where $R\overset{\frown}{R^{}}$ represents the real path length along the loading path A between points R and R, $R^{}\overset{\cup}{R^{*}}$ represents the circular arced "virtual path length" connecting R and R*, which can be approximated by the length of straight line connecting R and R*, and $R^{***}\overset{\frown}{R^*}$ represents the real path length along the loading path A between points R*** and R*. The loading path length L for the R-R* half cycle is merely determined by referring only to the real path length along the loading path A" between points R and R*:$\overset{\frown}{R^{}R^{*}}$.

The above-described data representing the counted half cycles, the stress ranges $\Delta\sigma_e$, the loading path lengths L, and the virtual path lengths can be used to construct a tangible set of equivalent constant amplitude loading data for the structure but to do so it will typically be necessary to repeat the aforementioned calculations for a plurality of additional loading paths of the load locus. More specifically, referring to FIGS. 1-3, these additional loading paths are referred to herein as loading paths B, C, D, and E. Additional maximum range identifications can be performed on each portion of the load locus 10 that lies outside of the loading path A. For example, in FIG. 2, the loading path A has be set back in phantom to highlight secondary loading paths B and C, which lie outside of the loading path A. Maximum range identifications are performed on each of these portions B, C of the load locus 10 to define respective additional loading paths that extend, respectively, from point P to point P' and from point Q to point Q'. Points P and Q become the new points of origin for each additional loading path B, C and points Pl and Q' become the new points of termination. Once these new loading paths have been established, the turning point identification, the half cycle division, the stress range $\Delta\sigma_e$, loading path length L, and virtual path length determinations described above with reference to the loading path A are performed on the additional loading paths B and C.

Referring to FIG. 3, the aforementioned process continues on successive loading paths, D, E, etc., delineated by successive points of origin P', Q' and termination P", Q" until the entire load locus 10 has been processed. Once the load locus has been processed, the half cycle data, the stress range $\Delta\sigma_e$ data, the loading path length L data, and the virtual path length data can be used to construct the set of equivalent constant amplitude loading data for the structure. The tangible set of equivalent constant amplitude loading data can be constructed in computer-readable form and stored in a computer-readable memory medium, such as a memory chip, a flash drive, an optical storage medium, etc., or may merely be constructed in human-readable form and stored in a human-readable medium, such as a printed report or a graphical illustration.

FIG. 8 illustrates schematically a system for converting multi-axial variable amplitude loading data of a fatigue prone location of a given tangible structure to a display of a tangible set of equivalent constant amplitude loading data. The data displayed represents the fatigue prone location of the structure. Typically, the graphical display will identify the frequency-of-occurrence of particular stress ranges $\Delta\sigma_e$ and/or loading path lengths L for the counted half cycles, e.g., in the form of a histogram-type plot of the fatigue prone location. In practice, such a representation is usually approximated by cycle-vs-bin number plot for simplicity, where a bin size is typically defined by the total stress range divided by an even integer, such as 32 or 64, which are often used in other types of fatigue analysis schemes. The system comprises a controller 20 that is programmed to input a multi-axial load locus 10 and perform the variety of operations described herein to output the converted data 30 for use in fatigue design, analysis, and life predictions. As is illustrated in FIG. 8, the converted data can include cycle count data, equivalent constant amplitude loading data, etc.

The methods and systems described herein for approximating the loading path length L may have the following physical basis. An S-N curve may be a two-dimension graph in which one axis represents the level of stress while the other axis represents the number of life cycles. A one to one relationship may exist for an S-N-curve-based fatigue data representation, such as $$\Delta\sigma = C_w^{(N_f)-\frac{1}{h_w}},\quad\text{(Eq. 1)}$$

and Paris-law-based crack growth rate data representation, such as $$da/dN = C_p(\Delta K)^{h_p},\quad\text{(Eq. 2)}$$

assuming the fatigue damage process is dominated by crack propagation. In Eq. 1, $$C_w = \left[\frac{a_f^{1-\frac{h_p}{2}} - a_0^{1-\frac{h_p}{2}}}{\left(1-\frac{h_p}{2}\right)C_p Y^{h_p}\pi^{\frac{h_p}{2}}}\right]^{\frac{1}{h_p}},\quad\text{(Eq. 3)}$$

$$h_w = h_p,$$

where $a_0$ is the initial crack length and $a_f$ is the crack length at failure. Y is a constant when assuming that the cracked body has a simple geometry such as an edge crack in a semi-infinite body.

Within each cycle, an incremental crack growth da as a function of stress increment dσ may be derived as $$\frac{da}{d\sigma} = h_p C_p Y^{h_p}\pi^{\frac{h_p}{2}}\sigma^{h_p-1}a^{\frac{h_p}{2}}\quad\text{(Eq. 4)}$$

by considering simple tensile loading part of the half cycle. In deriving Eq. 4, Eqs. 2 and 3 may be used. In the same fashion, shear-stress-dominated incremental crack growth as a function of shear stress may be derived. For simplicity, if the crack growth law exponent $h_p$ may be assumed to be the same for Modes I, II, and III, a generalized mixed-mode incremental crack growth as a function of an effective stress increment in a 3-D space may be written as $$\frac{da}{dS_e} = \Psi a^{\frac{h_p}{2}}\left(\int dS_e\right)^{h_p-1}\quad\text{(Eq. 5)}$$

$$dS_e = \sqrt{(d\sigma)^2 + \beta_{II}(d\tau_{II})^2 + \beta_{III}(d\tau_{III})^2},$$

where $\Psi$ is a constant. Eq. 5 may be reduced to the conventional Paris' Law for each individual stress component. Furthermore, Eq. 5 may be exactly the same as the following equation $$\Delta S_e^{(1)} = \int dS_e = \int\sqrt{(d\sigma)^2 + \beta(d\tau)^2}\quad\text{(Eq. 6)}$$

only if the normal stress (σ) and in-plane shear stress $\tau_{III}$ (note $\tau_s = \tau_{III}$) components are present. As a result, it can be argued that the length-based effective stress range can be derived on the basis Paris Law under mixed mode loading conditions. It should be noted that Eqs. 4 and 5 may be obtained based on the simplifications that a fatigue crack propagates in a self-similar manner or collinear under combined tensile, shear, and mixed-mode loading and that mean stress and stress triaxiality do not significantly affect fatigue damage.

It should be stressed that the path-dependent effective stress $\Delta S_e$ or path length definition may have a quadratic form with respect to the three stress components (see also Eq. 6) forming a stress space on which PDMR cycle counting is performed. Such a quadratic form can be inferred from fracture mechanics arguments already available in the literature for characterizing mixed-mode crack growth in the context of contained plasticity. For example, an instantaneous ratio χ of the original crack length to an equivalent crack length incorporating plastic zone according to Dugdale model may be related uniform traction stress components (or far-field stresses) as:

$$\chi \propto \cos\left(\frac{\pi}{2}\frac{\sqrt{\sigma^2 + 3(\tau_{II}^2 + \tau_{III}^2)}}{\sqrt{\sigma_0^2 + 3(\tau_{II0}^2 + \tau_{III0}^2)}}\right)\quad\text{(Eq. 7)}$$

after adopting von Mises criterion for combined Mode-I, Mode-II, and Mode-III loading. In Eq. 7, $\sigma_0$, $\tau_{II0}$ and $\tau_{III0}$ are the unixial yield strengths corresponding to Modes I, II, and III loading, respectively, while σ, $\tau_{II}$ and $\tau_{III}$ are applied uniformly distributed traction stress components on the crack face. For cyclic fatigue loading, one may introduce the plastic superposition method by replacing the component stress amplitude in Eq. 7 with corresponding component stress ranges, and replacing the component yield stresses with twice of their amplitude values. In doing so, one estimate for the relative plastic zone size crack size χ in Eq. 7 may be used to estimate the relative reversed plastic zone size $\chi_r$ under cyclic loading as $$\chi_r \propto \cos\left(\frac{\pi}{4}\frac{\sqrt{\Delta\sigma^2 + 3(\Delta\tau_{II}^2 + \Delta\tau_{III}^2)}}{\sqrt{\sigma_0^2 + 3(\tau_{II0}^2 + \tau_{III0}^2)}}\right).\quad\text{(Eq. 8)}$$

The same combination of component stresses or ranges may be found for expressing other fracture parameters such as stress intensity factor K, crack opening displacement COD, J-Integral, and strain energy release rate under multiaxial stress state. Therefore, the quadratic form of the path length definition in Eq. 6 can be further justified by considering relative reversed plastic zone size, at least within the context of crack propagation dominated fatigue phenomena, by setting, $$\beta_{II} = \beta_{III} = 3.$$

It must be noted that the superposition method (Eq. 8) does not consider the contribution due to load path within a cycle if the component stresses are out of phase. In contrast, the path length definition described herein is in both quadratic and incremental form within a load cycle, and therefore capable of distinguishing the contributions from out-of-phase loading.

Performing multi-axial fatigue evaluation of a fatigue prone location of a tangible structure may be done by calculating the fatigue crack growth cycle-by-cycle with the help of the modified Paris law for the tangible structure. For mixed-mode loading, the fatigue crack growth rate is expressed by the following modified Paris-type model $$\frac{da}{dN} = C_p(\Delta K_{eq})^{h_p}$$

where the equivalent stress intensity factor range $\Delta K_{eq}$ is written in the following integral form:

$$\Delta K_{eq} = \int dK_{eq},$$

where $$dK_{eq} = \sqrt{\pi a}\, dS_e$$

and $$dS_e = \sqrt{(d\sigma_I)^2 + \sum_{i=II}^{III} \beta_i (d\tau_i)^2},$$

which is exactly Eq. 5.

The methods and systems described herein may be used to perform fatigue evaluation of fatigue prone locations, such as weld joints, of a tangible structure. Furthermore, these methods may be used to evaluate non-welded fatigue prone locations as well, in which case the failure plane (geometric plane) may not be known a priori. In this case, one or more candidate planes (geometric planes) may be selected for evaluation. The evaluation then may be performed on all the candidate planes so as to provide an indication of which candidate plane or planes may be more susceptible to failure. This approach may first transform the multi-axial stress state into the normal stress and the shear stress acting on each candidate plane. Next the methods described herein may be used to evaluate fatigue damage to each candidate plane. Finally, the critical candidate plane or planes (e.g., the one or ones experiencing the most damage) may be determined from the set of initial candidate planes. Thus, the methods described herein may be used to assess the multi-axial fatigue life of non-welded tangible structures, in which both the fatigue life and the failure plane need to be ascertained.

Although various embodiments and aspects of the present disclosure have been described in the context where the load parameters comprise stress or strain components, it is noted that the load parameters may also comprise time histories of force, torque, acceleration, deflection, and combinations thereof. Regardless of the form in which the set of equivalent constant amplitude loading data is constructed, the data can be used in any of a variety of structural design and manufacturing optimization processes to modify or validate the design of the structure or to modify or validate the structure itself and is particularly useful where the structure is typically subject to multi-axial, variable amplitude loading conditions because these types of loading conditions can be converted to a set of equivalent constant amplitude cycle definitions, which have more practical utility in the structural design and manufacturing industries. In many cases, it will be advantageous to calculate a final fatigue damage by applying a conventional or yet-to-be developed damage summation method, such as, for example, Miner's rule, which can be used to calculate final fatigue damage or the remaining life of a structure.

For the purposes of describing and defining the present invention, it is noted that some determinations are described herein as being made "with reference to" a given value or condition. This language has been selected to anticipate that additional factors may be utilized to make the stated determination without departing from the scope of the present invention.

It is noted that recitations herein of a component of the present invention being "programmed" to embody a particular property or function in a particular manner, is a structural recitation, as opposed to a recitation of intended use. More specifically, the references herein to the manner in which a controller is "programmed" denotes an existing physical condition of the controller and, as such, is to be taken as a definite recitation of the structural characteristics of the controller.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. A method of performing fatigue evaluation of a fatigue prone location of a tangible structure by converting multi-axial loading data of the fatigue prone location of the tangible structure to a set of equivalent constant amplitude loading data for the tangible structure, the method comprising:

subjecting the fatigue prone location of the structure to one-time or repeated multi-axial variable amplitude loading;

producing multi-axial loading data from the multi-axial variable amplitude loading to which the fatigue prone location is subjected;

generating a multi-axial load locus representing the tangible structure by mapping load parameters of the multi-axial loading data into an equivalent space of dimension n, where n represents the number of independent stress or strain components used in the mapping;

identifying a maximum range between two points on the load locus to define a loading path along at least a portion of the load locus, the loading path extending from a point of origin P to a point of termination Q;

identifying any time-dependent interior turning points R and any corresponding projected turning points R* along the loading path from the point of origin P to the point of termination Q;

counting half cycles in the loading path by referring to the interior and projected turning points R, R* along the loading path and to the point of origin P and the point of termination Q on the load locus;

determining a stress range $\Delta\sigma_e$, loading path length L, and virtual path length for each of the counted half cycles;

determining additional stress ranges $\Delta\sigma_e$, loading path lengths L, and virtual path lengths recursively for half cycles counted in additional loading paths on the load locus;

transforming data representing the counted half cycles, the stress ranges $\Delta\sigma_e$, the loading path lengths L, the virtual path lengths or combinations thereof, to a tangible set of equivalent constant amplitude loading data representing the tangible structure; and displaying the tangible set of equivalent constant amplitude loading data as a representation of the tangible structure.

2. A method as claimed in claim 1 wherein the fatigue prone location of the tangible structure comprises a welded or non-welded joint, a laminated region, a weight bearing region, an extension, a flexure, a buttress, or a combination thereof.

3. A method as claimed in claim 1 wherein the tangible set of equivalent constant amplitude loading data comprises a graphical display identifying a frequency-of-occurrence of particular stress ranges $\Delta\sigma_e$, loading path lengths L, and virtual path lengths for the counted half cycles.

4. A method as claimed in claim 1 wherein the method further comprises a manufacturing process where the tangible structure is manufactured utilizing the tangible set of equivalent constant amplitude loading data to validate or modify the configuration of the fatigue prone location of the tangible structure.

5. A method as claimed in claim 1 wherein:
interior turning points R along the loading path are identified by referring to a net travel distance along the loading path from the point of origin P of the loading path and by referring to a point at which the net travel distance stops increasing; and
projected turning points R* are identified by referring to a point at which the net travel distance recovers from a previous reduction.

6. A method as claimed in claim 5 wherein additional interior and projected turning points R, R* along the loading path are identified by referring to a net travel distance along the loading path from a previously identified interior turning point R of the loading path.

7. A method as claimed in claim 1 wherein half cycles are counted in the loading path by:
assigning one half cycle to the loading path as a whole, as defined by the point of origin and the point of termination on the load locus; and
assigning additional half cycles to the loading path by identifying interior and projected turning point pairs in the loading path and assigning one half cycle to each turning point pair.

8. A method as claimed in claim 1 wherein:
the stress range $\Delta\sigma_e$ for each half cycles is determined by referring to a shortest-distance measurement between the points at which the half cycle originates and terminates.

9. A method as claimed in claim 1 wherein:
the loading path length L for each half cycle is determined by summing real and virtual path lengths along the loading paths.

10. A method as claimed in claim 9 wherein the loading path length L for each half cycle is determined by summing (i) real path length values for portions of the loading path outside of any turning point pairs along the loading path in the selected half cycle and (ii) virtual path length values between the outermost interior turning points and the corresponding projected turning points of the selected half cycle if the selected cycle includes interior turning points and the corresponding projected turning points.

11. A method as claimed in claim 1 wherein the tangible set of equivalent constant amplitude loading data is constructed in computer-readable form and is stored in a computer-readable memory medium.

12. A method as claimed in claim 1 wherein the tangible set of equivalent constant amplitude loading data is constructed in human-readable form and is stored in a human-readable medium.

13. A method as claimed in claim 1 wherein:
the multi-axial loading data represents multi-axial, variable amplitude loading conditions; and
the multi-axial, variable amplitude loading conditions are converted to a set of equivalent constant amplitude cycle definitions utilizing the tangible set of equivalent constant amplitude loading data for the structure.

14. A method as claimed in claim 1 wherein additional loading paths on the load locus are identified by identifying additional maximum ranges on the load locus inside or outside of previously identified maximum ranges on the load locus.

15. A method as claimed in claim 1 wherein additional stress ranges $\Delta\sigma_e$, loading path lengths L, and virtual path lengths are determined recursively for all half cycles on the load locus until all loading paths on the load locus have been counted once.

16. A method as claimed in claim 1 wherein the two points on the load locus defining the maximum range comprise:
beginning and ending data points of the load locus;
the beginning data point of the load locus and a data point somewhere within the load locus;
the ending data point of the load locus and a data point somewhere within the load locus; or
two data points somewhere within the load locus.

17. A method as claimed in claim 1 wherein generating the multi-axial load locus comprises mapping a shear stress parameter $\tau_s$ onto the multi-axial load locus by using $$\sqrt{\beta}\frac{\tau_s}{|\tau_s|}|\tau_s|^\gamma,$$

where $\beta$ and $\gamma$ are constants associated with a material of the tangible structure.

18. A method as claimed in claim 1 wherein generating the multi-axial load locus comprises mapping a shear stress parameter $\tau_s$ onto the multi-axial load locus by using an equivalent shear stress amplitude $\tau^*$ and selecting a normal stress parameter $\sigma_s$ as a reference stress.

19. A method as claimed in claim 1 wherein generating the multi-axial load locus comprises mapping a normal stress parameter $\sigma_s$ onto the multi-axial load locus by using an equivalent normal stress amplitude $\sigma^*$ and selecting a shear stress parameter $\tau_s$ as a reference stress.

20. A method as claimed in claim 1 further comprising selecting one or more geometric planes passing through the fatigue prone location, such that the method of performing fatigue evaluation is performed for each of the one or more geometric planes.

21. A method for automatically calculating an incremental growth of a fatigue crack in a fatigue prone location of a tangible structure, the method comprising:
subjecting the fatigue prone location of the tangible structure to a one-time or repeated loading event;
determining an incremental normal stress $d\sigma_I$, an incremental mode-II shear stress $d\tau_{II}$, and an incremental mode-III shear stress $d\tau_{III}$ applied to the fatigue prone location during the one-time or repeated loading event;
transforming the incremental normal stress $d\sigma_I$, incremental mode-II shear stress $d\tau_{II}$, and the incremental mode-III shear stress $d\tau_{III}$ into tangible data representing the incremental growth of the fatigue crack after the one-time or repeated loading event, such that the incremental growth corresponds to $$C_p(\sqrt{\pi a}\sqrt{((d\sigma_I)^2+\beta_{II}(d\tau_{II})^2+\beta_{III}(d\tau_{III})^2)})^{h_p},$$

wherein a is a length of the crack before the one-time or repeated loading event, $\beta_{II}$ is a constant based on a material of the tangible structure and corresponds to an equivalency ratio of fatigue strengths between normal stress and mode-II shear stress, $\beta_{III}$ is a constant based on the material of the tangible structure and corresponds to an equivalency ratio of fatigue strengths between normal stress and mode-III shear stress, and $C_p$ and $h_p$ are material constants corresponding to Paris' Law; and displaying the tangible data representing the incremental growth of the fatigue crack as a representation of the tangible structure after the one-time or repeated loading event.

22. A system for performing fatigue evaluation, the system comprising a controller and a display, wherein the system is programmed to input a multi-axial load locus representing a fatigue prone location of a tangible structure under multi-axial loading and convert the multi-axial loading data of the fatigue prone location to a set of equivalent constant amplitude loading data for the tangible structure by:

generating a multi-axial load locus by mapping load parameters of the multi-axial loading data into an equivalent space of dimension n, where n represents the number of independent stress or strain components and the multi-axial loading data is produced by subjecting the fatigue prone location of the structure to a one-time or repeated loading event such that the multi-axial load locus represents the tangible structure;

identifying a maximum range between two points on the load locus to define a loading path along at least a portion of the load locus, the loading path extending from a point of origin P to a point of termination Q;

identifying any time-dependent interior turning points R and any corresponding projected turning points R* along the loading path from the point of origin P to the point of termination Q;

counting half cycles in the loading path by referring to the interior and projected turning points R, R* along the loading path and to the point of origin P and the point of termination Q on the load locus;

determining a stress range $\Delta\sigma_e$, loading path length L, and virtual path length for each of the counted half cycles;

determining additional stress ranges $\Delta\sigma_e$, loading path lengths L, and virtual path length recursively for half cycles counted in additional loading paths on the load locus;

transforming data representing the counted half cycles, the stress ranges $\Delta\sigma_e$, the loading path lengths L, and the virtual path lengths or combinations thereof, to a tangible set of equivalent constant amplitude loading data representing the tangible structure; and displaying the tangible set of equivalent constant amplitude loading data on the display as a representation of the tangible structure.

23. A method of counting and displaying the number of load cycles represented in multi-axial loading data of a fatigue prone location of the tangible structure, the method comprising:

subjecting the fatigue prone location of the structure to one-time or repeated loading event;

producing multi-axial loading data from the loading event to which the fatigue prone location is subjected;

generating a multi-axial load locus representing the tangible structure by mapping load parameters of the multi-axial loading data into an equivalent space of dimension n, where n represents the number of independent stress or strain components used in the mapping;

identifying a maximum range between two points on the load locus to define a loading path along at least a portion of the load locus, the loading path extending from a point of origin P to a point of termination Q;

identifying any time-dependent interior turning points R and any corresponding projected turning points R* along the loading path from the point of origin P to the point of termination Q;

counting half cycles in the loading path by referring to the interior and projected turning points R, R* along the loading path and to the point of origin P and the point of termination Q on the load locus; and displaying data representing the counted half cycles as a representation of the tangible structure.

24. A method of performing fatigue evaluation of a fatigue prone location of a tangible structure by converting uni-axial or multi-axial loading data of the fatigue prone location of the tangible structure to a set of equivalent constant amplitude loading data for the tangible structure, the method comprising:

subjecting the fatigue prone location of the structure to one-time or repeated loading event;

producing multi-axial loading data from the loading event to which the fatigue prone location is subjected;

generating a load locus by mapping load parameters of the loading data into an equivalent space of dimension n, where n represents the number of independent stress or strain components used in the mapping;

identifying a maximum range between two points on the load locus to define a loading path along at least a portion of the load locus, the loading path extending from a point of origin P to a point of termination Q;

identifying any time-dependent interior turning points R and any corresponding projected turning points R* along the loading path from the point of origin P to the point of termination Q;

counting half cycles in the loading path by referring to the interior and projected turning points R, R* along the loading path and to the point of origin P and the point of termination Q on the load locus;

determining a stress range $\Delta\sigma_e$, loading path length L, and virtual path length for each of the counted half cycles;

determining additional stress ranges $\Delta\sigma_e$, loading path lengths L, and virtual path lengths recursively for half cycles counted in additional loading paths on the load locus;

transforming data representing the counted half cycles, the stress ranges $\Delta\sigma_e$, the loading path lengths L, the virtual path lengths or combinations thereof, to a tangible set of equivalent constant amplitude loading data representing the tangible structure; and displaying the tangible set of equivalent constant amplitude loading data as a representation of the tangible structure.

\* \* \* \* \*

UNITED STATES PATENT AND TRADEMARK OFFICE
CERTIFICATE OF CORRECTION

PATENT NO. : 8,649,985 B2  Page 1 of 1
APPLICATION NO. : 13/143630
DATED : February 11, 2014
INVENTOR(S) : Dong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 395 days.

Signed and Sealed this
Twenty-ninth Day of September, 2015

Michelle K. Lee
*Director of the United States Patent and Trademark Office*